Figure 1:
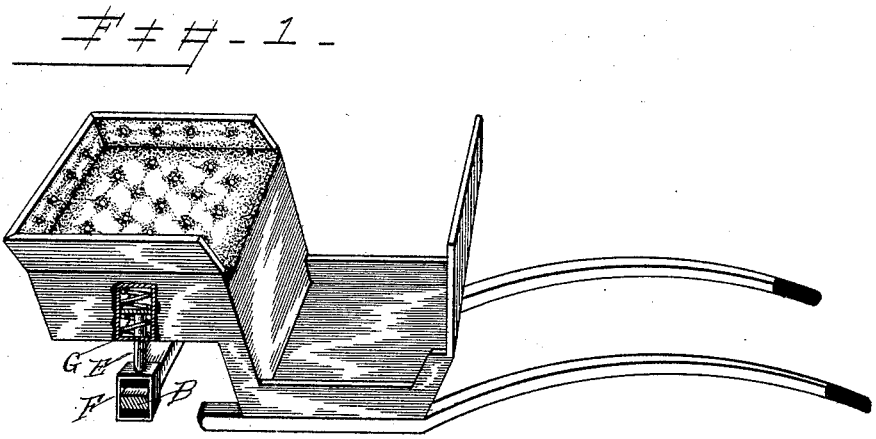

(No Model.)

R. SPROUL.
VEHICLE SPRING.

No. 396,671. Patented Jan. 22, 1889.

Witnesses
Albert B. Blackwood
Louise Paul

Inventor
Robert Sproul
By Connolly Bros
Attys

UNITED STATES PATENT OFFICE.

ROBERT SPROUL, OF PITTSBURG, PENNSYLVANIA.

VEHICLE-SPRING.

SPECIFICATION forming part of Letters Patent No. 396,671, dated January 22, 1889.

Application filed July 2, 1888. Serial No. 278,833. (No model.)

*To all whom it may concern:*

Be it known that I, ROBERT SPROUL, a citizen of the United States, residing at Pittsburg, in the county of Allegheny and State of Pennsylvania, have invented certain new and useful Improvements in Wheeled Vehicles; and I do hereby declare the following to be a full, clear, and exact description of the invention, reference being had to the accompanying drawings, which form part of this specification.

This invention has relation to running-gear for wagons and carriages, and is particularly adapted and designed for use upon vehicles having elliptic springs, though it may be used with good effect upon other classes of vehicles having springs of other construction.

Vehicles having the body mounted upon springs are subject when in use to a continuous movement, either rocking or up and down, caused by the inequalities of the surface over which they travel, and this movement is not alone disagreeable to the occupants of the vehicle, but at the same time is the cause of damage and breaking both to the running-gear and the springs. Particularly is this the case where sudden jolting is caused by running the vehicle over rough roads. As will be readily understood, when the wheels of the vehicle descend into a depression the body is jolted downward and depresses the spring, and in the upward movement of the body the spring is expanded beyond its normal position and oftentimes damaged or broken, and in some cases the downward movement of the body beyond a given point will so flatten or depress the spring as to cause the same damage.

My device both eases the sudden jolt by its elasticity and limits both the upward and downward movement to any desired extent.

The object of this invention is to provide a means whereby the movement of the body of the vehicle either up or down and the consequent pressure of the spring is limited or regulated and the auxiliary springs utilized or brought into play when the movement of the body is beyond a predetermined point, these auxiliary springs not only preventing the damage to the ordinary spring, but also causing the movement of the body of the vehicle to be much steadier than where these devices are not employed. By the use of these devices a lighter or softer spring can be used and will answer the purpose of the ordinary weight of spring.

This invention therefore consists in the combination, with the running-gear and body of a vehicle, of spring-braces designed and adapted to limit the strain upon the supporting-springs in either direction.

This invention further consists in the construction, combination, and arrangement of parts, more fully described hereinafter, and specifically pointed out in the claims.

Figure 2:
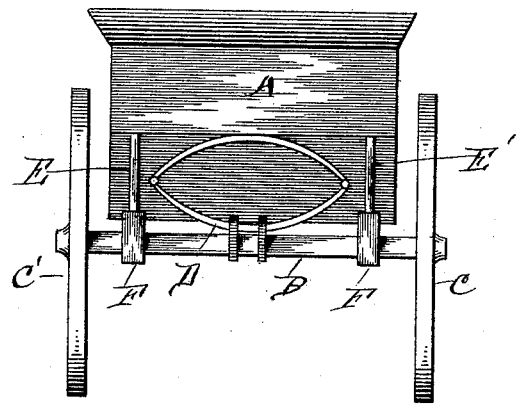
Figure 3:
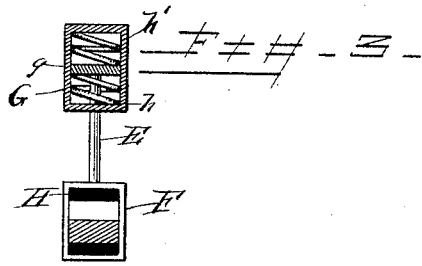

Referring to the accompanying drawings, Figure 1 is a side view, and Fig. 2 an end view, of a two-wheeled vehicle with my improvement attached; and Fig. 3, a detail view partly in section.

A represents the body of the vehicle, B the axle, and C C' the wheels. The body A is attached to the axle through the medium of the ordinary spring, D.

E E' represent the brace-rods, which, as shown more clearly in Fig. 1 of the drawings, are attached at their lower ends to stirrups or frames F, which encircle the axle, their upper ends passing into cases G, which are preferably cylindrical in form, the rod E being free to move vertically within the case, and being provided with an adjusting-nut, $g$, near its upper end, spring, $h\ h'$, surrounding that portion of the rod which is inside the casing, one below and the other above the nut $g$, both of them impinging against the nut and limiting the vertical movement of the rod. A block or rubber, H, or other suitable cushion is inserted on top and bottom of inner side of stirrup, making the action entirely noiseless. The rods keep the stirrups in such a position as to not allow the sides of the stirrups to come into contact with the axle, thereby preventing all rattling.

There is sufficient room allowed between the bottom of the axle and the bottom of the frame F to permit a slight movement to the vehicle-body without its being affected by the rods E E'.

The operation of the device is as follows: In ordinary movements of the body of the vehicle the brace-rods E E' will have no effect; but when a sudden jolt causes the body to descend beyond the regulated limit of movement the frame or stirrup will bear upon the axle and prevent its further descent, the nut $g$ being pressed against the spring $h$, which by its elasticity will gradually stop the downward movement of the vehicle. If the movement of the body be upward, the stirrup will press against the bottom of the axle and the nut $g$ against the spring $h'$, and thus limit the upward movement of the body.

It will be seen that any swaying of the body will be eased or entirely prevented by the action of the brace-rods and springs.

I have shown the casing G as being attached to the rocker in the inner side of the vehicle; but I do not wish to limit myself to this construction, as they may be attached by suitable clips to the bottom of the vehicle, or any suitable place, according to the construction of the vehicle, without departing from the spirit of my invention.

The action of the spring is entirely governed by the length of the stirrup surrounding the axle, as the free movement of the spring entirely depends thereon; hence it is obvious that different springs of various width apart would necessarily require different lengths of stirrups.

What I claim is—

1. The combination, with the running-gear and body of a vehicle, of a brace-rod attached at its lower end to the axle and provided at its upper end with two springs, whereby the vertical movement of the vehicle-body is controlled and limited, substantially as described.

2. The combination, with the running-gear and body of a vehicle, of a vertical brace-rod provided at its lower end with a frame which embraces the axle and is attached to the body of the vehicle by means of a hollow casing containing buffer-springs, substantially as described.

3. The combination, with the running-gear and body of a vehicle, of rods E E', frame F, casing G, and springs $h\ h'$, all arranged and combined substantially as described.

In testimony that I claim the foregoing I have hereunto set my hand this 26th day of June, 1888.

ROBERT SPROUL.

Witnesses:
   H. C. EVERT,
   LOUIS MOESER.